I. E. PALMER.
TRACKLESS POWER DRIVEN VEHICLE.
APPLICATION FILED NOV. 13, 1908.
938,786.
Patented Nov. 2, 1909.
3 SHEETS—SHEET 2.
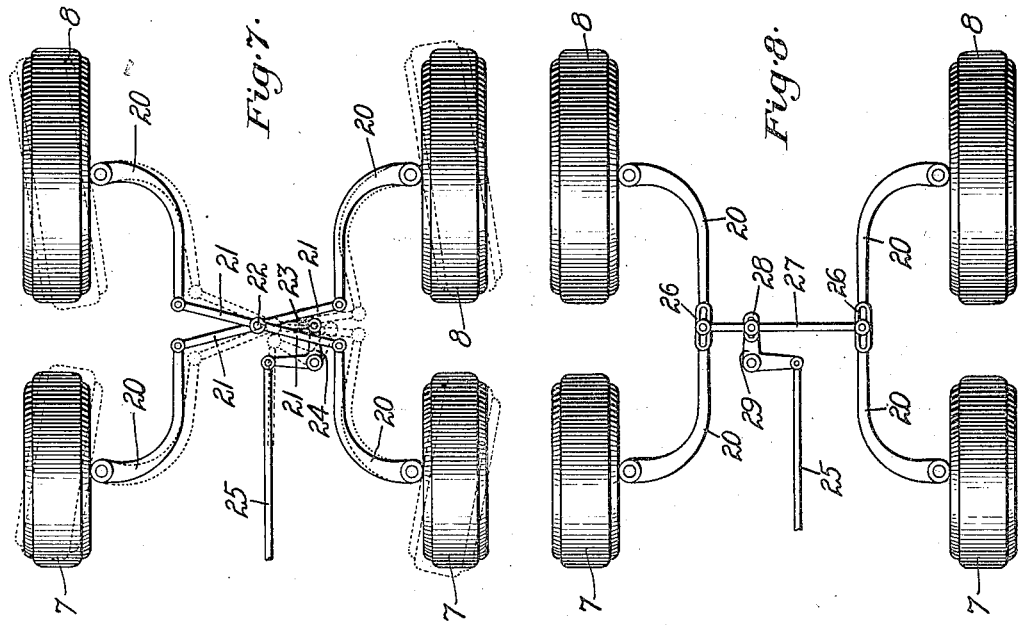
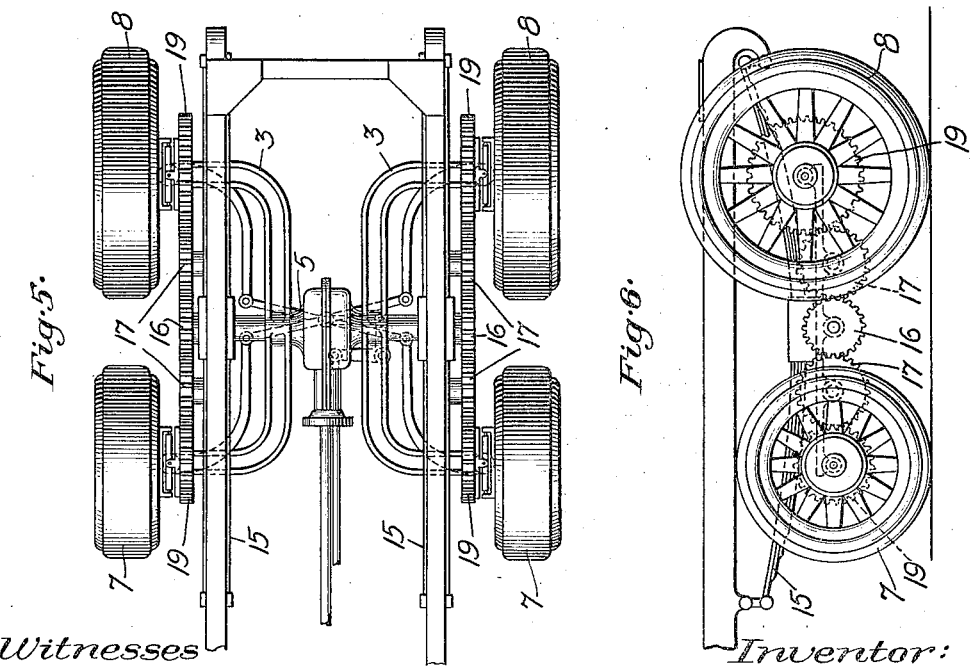
Witnesses
Horace H. Crossman
William C. Glass
Inventor:
Isaac E. Palmer
by Emery & Booth
Att'ys I. E. PALMER.
TRACKLESS POWER DRIVEN VEHICLE.
APPLICATION FILED NOV. 13, 1908.
938,786.
Patented Nov. 2, 1909.
3 SHEETS—SHEET 3.
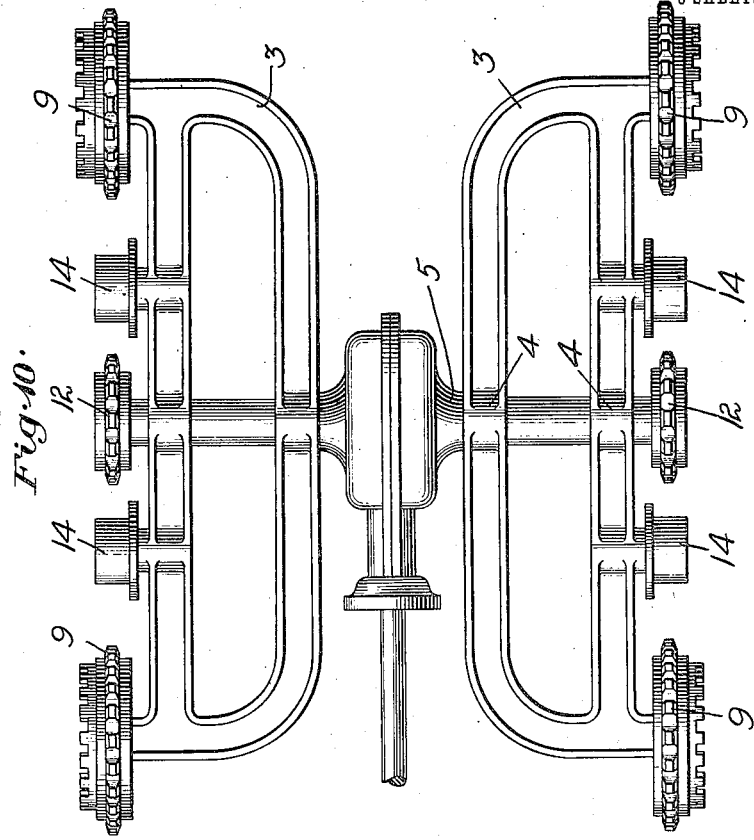
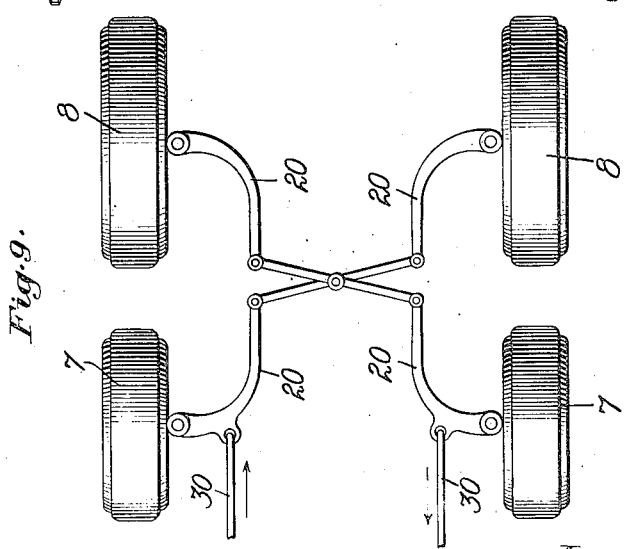
Witnesses:
Horace H. Crossman
William C. Glass
Inventor:
Isaac E. Palmer
by Emery + Booth
Att'ys

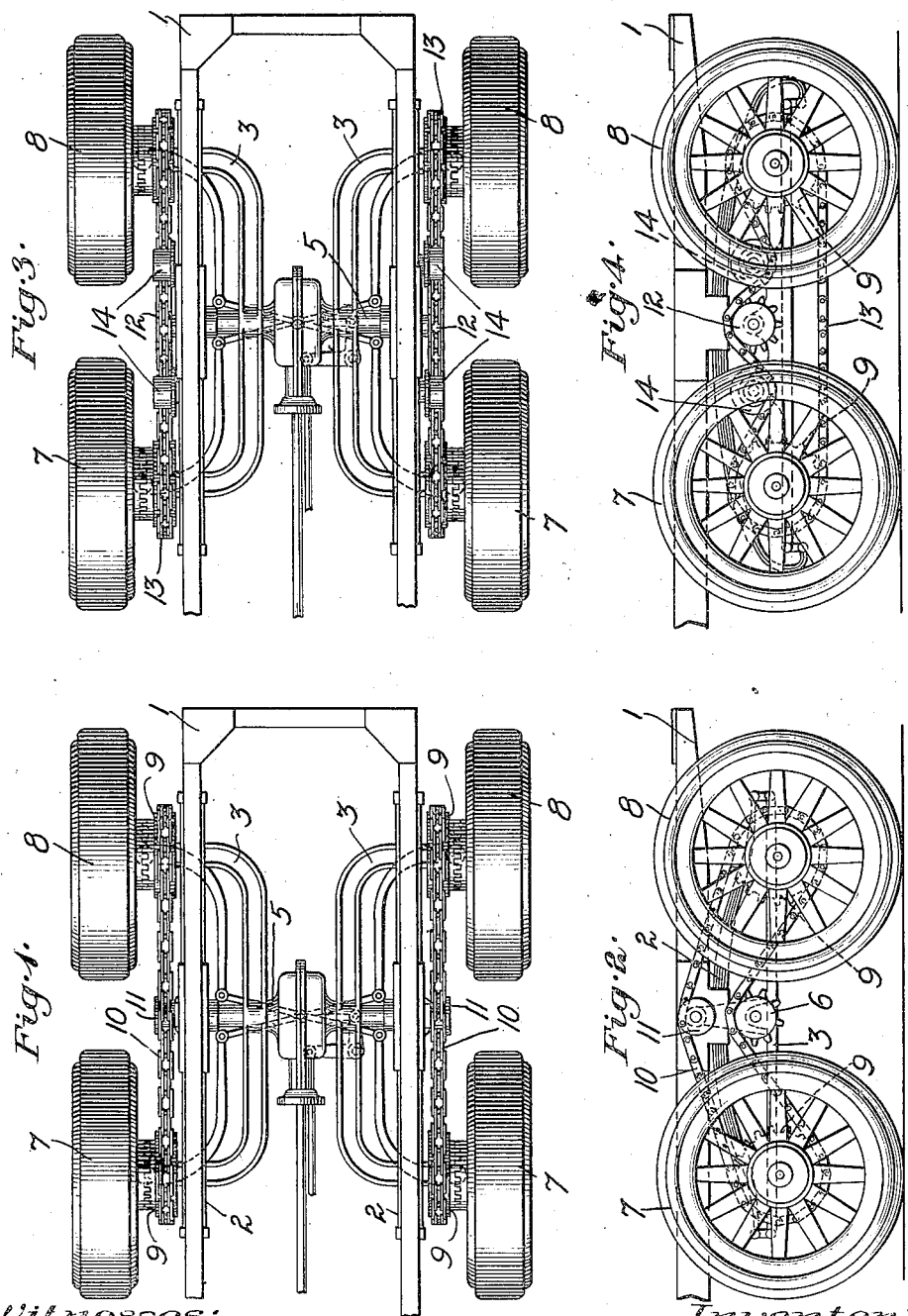

UNITED STATES PATENT OFFICE.

ISAAC E. PALMER, OF MIDDLETOWN, CONNECTICUT.

TRACKLESS POWER-DRIVEN VEHICLE.

938,786.  Specification of Letters Patent.  Patented Nov. 2, 1909.

Application filed November 13, 1908. Serial No. 462,361.

*To all whom it may concern:*

Be it known that I, ISAAC E. PALMER, a citizen of the United States, residing at Middletown, in the county of Middlesex and State of Connecticut, have invented an Improvement in Trackless Power-Driven Vehicles, of which the following description, in connection with the accompanying drawings, is a specification, like numerals on the drawings representing like parts.

This invention relates to trackless, power driven vehicles, and has more particularly for its objects to provide a construction whereby if desired the use of pneumatic tires may be avoided, to provide increased traction, to provide more extensive wheel support so as to reduce the weight upon individual wheels, to reduce the liability of skidding, and to provide suitable yielding supports for the wheels.

In order that the principles of the invention may be clearly understood, I have disclosed certain types or embodiments of my invention in the accompanying drawings, wherein—

Figure 1 is a plan view of the rear part of an automobile provided with my invention; Fig. 2 is a side elevation of the construction shown in Fig. 1; Fig. 3 is a view similar to Fig. 1, but representing a slightly modified form of driving mechanism; Fig. 4 is a side elevation of the construction shown in Fig. 3; Fig. 5 is a view similar to Fig. 1, but representing another form of driving mechanism; Fig. 6 is a side elevation of the construction shown in Fig. 5; Fig. 7 is a somewhat diagrammatic view of a form of means for steering the wheels; Fig. 8 is a similar view of a somewhat different form of steering mechanism; Fig. 9 is a detail of a modified form of steering mechanism; Fig. 10 is a view upon an enlarged scale of the yokes or frames, and showing their relation to the axle and the vehicle wheels.

Referring first to the form of the invention represented in Figs. 1 and 2 and to the form of yoke shown in Fig. 10, the body frame of the automobile (the rear part only of the frame being shown in said figures) is represented at 1, it being of any suitable type and construction.

Suitably connected to the under side of the side members of the body frame are springs 2—2, one of which is shown more clearly in Fig. 2. These springs may be connected either at their ends or at a part intermediate their ends to the vehicle body. The ends of each spring are here shown as connected in any desired manner with the ends of a yoke or frame 3, which may be of any suitable shape, but which is here represented as of a general D form (see Fig. 10). Each yoke or frame, as shown more clearly in Fig. 10, is provided with one or more bearings 4, by which it is mounted for rocking movement upon a divided axle 5 of usual type, the yokes or frames being oppositely positioned as shown. Any suitable driving means may be provided. In Figs. 1 and 2, I have shown a sprocket drive comprising a sprocket gear 6 mounted upon and driven by the power driven member of the axle 5.

The wheels 7—7, 8—8 are mounted upon the yokes or frames 3—3 for lateral deflecting movement with respect to the longitudinal axis of the vehicle. To permit the desired rocking or steering movement of the wheels, they may be connected in any suitable manner to the yokes 3, as for example by means of rocking rings, such as shown in my application Serial No. 448,129, filed August 12, 1908, or by means of intermeshing teeth, such as shown in my Patent No. 889,960. Preferably each of the wheels is mounted for rocking or steering movement. In the form of my invention shown in Figs. 1 and 2, each of the wheels is provided with a suitable sprocket gear 9, about which and the sprocket gear 6 passes a driving sprocket chain 10. If desired, a guiding roll or sprocket gear 11 suitably supported from the yoke or frame 3 may be provided between each of the wheels 7 and 8.

The construction shown in Figs. 3 and 4 is similar to that shown in Figs. 1 and 2, excepting that the driving sprocket gears 12 engage the upper run of the sprocket chains 13, and sprocket chain guiding rolls or gears 14—14 are provided upon opposite sides of the gears 12. Said gears 14 are mounted upon the yokes or frames 3.

The construction shown in Figs. 5 and 6 is similar to that shown in Figs. 1 and 2, with the exception that the springs 15—15 are connected at their ends in any suitable manner to the side members of the body frame, and that instead of employing sprocket driving gearing I have substituted gear wheels. These gear wheels may be of any suitable type, but are herein represented as composed of gears 16 mounted upon the divided axle 5 and receiving motion from the driven part thereof. With the gears 16 mesh gears 17—17 mounted upon the yokes or frames 3—3, and upon the wheels 7—7, 8—8 are provided gears 19—19 meshing with the gears 17—17. Any other suitable form of driving mechanism may be employed.

In each of the forms of my invention, it will be apparent that the yokes 3—3 are so mounted as to rock, and being connected to the vehicle body by springs, they may move relatively thereto if an obstruction be presented to one or more of the wheels, and that they may move independently of each other. While the normal position of each yoke or frame is parallel to the side members of the vehicle body, it is apparent that they may tilt to any angle with regard to it and may also under certain conditions move bodily toward and from it, while maintaining their normal position of parallelism with it. In other words, the yokes 3—3 may adjust themselves to any position dependent upon the obstructions encountered and the character of the road bed. If desired, the opposite yokes may be connected together or formed as a single yoke, but preferably they are independent. They may if desired be provided with interengaging or mutually supporting parts.

While I have herein represented the rear part of an automobile as provided with yokes 3 supporting driven wheels, it is to be understood that if desired the forward part of the automobile may be similarly constructed.

Preferably each of the four wheels is mounted for lateral deflection as previously referred to. Any suitable means may be employed to deflect said wheels. Preferably the deflecting means is connected to the usual steering mechanism of the automobile, not herein shown. As shown in Figs. 1 to 6 inclusive and diagrammatically in Fig. 7, each of the wheels is provided with a steering lever 20. Any operating means may be employed to move the levers 20 in unison. As indicated in dotted lines in Fig. 7, the leading wheels 7—7 are laterally deflected in a direction opposite to the lateral deflection of the wheels 8—8, so that the wheels 7, 8, of each side set follows the same curve and hence may travel at the same speed when deflected, rendering unnecessary the employment of clutch mechanism for the wheels, or other mechanism permitting one pair of the wheels to travel at a different speed from the other pair. To accomplish this result, I have pivotally connected the inner end of each lever 20 to links 21 connected by a common bolt 22. Movement of the bolt 22 toward either side of the vehicle simultaneously deflects the wheels 7—7 and 8—8 in opposite directions into the same curved path. While this movement may be accomplished in any suitable manner, I have herein represented a link 23 pivoted at one end to the bolt 22 and pivoted at the other end to one arm of a bell crank lever 24 suitably mounted upon the frame, the opposite arm of said lever being pivoted to the rod 25 of the steering mechanism of the vehicle.

In Fig. 8, I have represented a slightly modified form of mechanism for operating the levers 20. In such construction the levers 20 are connected by pin and slot connections 26 to the connecting rod 27 having a pin and slot connection 28 to the suitably mounted bell crank lever 29 which in turn is connected to the rod 25 of the steering mechanism.

If desired, a steering rod, such as 25, may be directly connected to one of the levers 20. In Fig. 9, I have represented two steering rods 30—30 directly connected to the levers 20—20 of the leading wheels 7—7. Forward longitudinal movement of one of said rods 30 will serve to deflect the leading wheels 7—7 in one direction, while forward longitudinal movement of the other steering rod 30 will deflect said leading wheels 7—7 in the opposite direction. Upon movement of either steering rod 30, the wheels 8—8 are oppositely deflected with respect to the steering wheels 7—7.

Having thus described one type or embodiment of my invention, I desire it to be fully understood that although specific terms are employed, they are used in a generic and descriptive sense and not for purposes of limitation, the scope of the invention being set forth in the following claims.

Claims.

1. Running gear for trackless power driven vehicles comprising, in combination, a vehicle body, an axle or support, a pair of independent yokes or frames, mounted for independent rocking movement at opposite sides of the vehicle upon the axle or support in conformity to the road bed, a yielding connection between each yoke or frame and the vehicle body, and means mounted concentrically with one or both of said yokes or frames for driving one or more of the wheels upon each yoke or frame.

2. Running gear for trackless, power driven vehicles, comprising in combination a vehicle body, an axle, a yoke pivoted upon the axle, a pair of wheels mounted upon the yoke, a driving gear supported by the axle yoke, a driving gear in driving relation to said wheels, and supporting connections between said yoke and vehicle body.

3. Running gear for trackless, power driven vehicles comprising in combination, a vehicle body, an axle, a yoke pivoted upon the axle, a pair of wheels mounted upon the yoke, a driving gear supported by the axle, a sprocket chain connecting said gear and wheels, and a supporting spring between said yoke and vehicle body.

4. Running gear for trackless power driven vehicles comprising, in combination, a vehicle body, an axle or support, a pair of independent yokes or frames mounted for independent rocking movement at opposite sides of the vehicle upon the axle or support in conformity to the road bed, and driven wheels supported at opposite parts of each of said yokes or frames.

5. Running gear for trackless power driven vehicles comprising, in combination, a vehicle body, an axle or support, a pair of independent yokes or frames mounted for independent rocking movement at opposite sides of the vehicle upon the axle or support in conformity to the road bed, all of the wheels upon said yoke or frame being dirigible, and yielding connections between said yokes or frames and the vehicle body.

6. Running gear for trackless, power driven vehicles comprising in combination, a vehicle body, an axle, a yoke pivoted upon the axle, a pair of wheels mounted upon the yoke, means positively to deflect said wheels in opposite directions, and a spring support between said yoke and said vehicle body.

7. Running gear for trackless power driven vehicles comprising, in combination, a vehicle body, an axle, a pair of opposite independent yokes, pivoted upon said axle for independent rocking movement in conformity to the road bed, and a plurality of wheels mounted upon each yoke, all of said wheels being laterally deflectable.

8. Running gear for trackless, power driven vehicles comprising in combination, a vehicle body, an axle, a closed frame supported for rocking movement at a plurality of points upon said axle, two laterally deflectable wheels mounted upon said frame, and a supporting spring having its ends and intermediate part connected to the frame and vehicle body.

9. Running gear for trackless, power driven vehicles comprising in combination, a vehicle body, an axle, a pair of opposite, independent yokes pivoted upon said axle for independent rocking movement in conformity to the road bed, a pair of wheels mounted upon each of said yokes, means laterally to deflect said wheels simultaneously, and springs connecting said yokes and said vehicle body.

10. Running gear for trackless, power driven vehicles comprising in combination, a vehicle body, an axle, a pair of opposite, independent yokes pivoted upon said axle, a pair of wheels mounted upon each of said yokes, means to deflect the leading wheels and rear wheels of said pairs in directions opposed to each other and yielding connections between said yokes and frame.

11. Running gear for trackless, power driven vehicles comprising in combination a vehicle body, frame supporting means thereon, a pair of opposite, independent frames pivoted upon said supporting means, a pair of wheels mounted upon each of said frames, and means to deflect the leading wheels and rear wheels of said pairs in directions opposed to each other.

12. Running gear for trackless, power driven vehicles comprising in combination a vehicle body, a frame support secured thereto, a frame pivoted upon said support, a pair of wheels arranged one in advance of the other and mounted on the frame, a driving gear mounted upon said frame support and driving connections between said gear and both of said wheels.

13. Running gear for trackless power-driven vehicles comprising in combination a vehicle body, an axle or support, a pair of independent yokes or frames mounted for independent rocking movement at opposite sides of the vehicle upon the axle or support in conformity to the road-bed, and dirigible wheels supported at opposite parts of each of said yokes or frames.

14. Running gear for trackless power-driven vehicles comprising in combination a vehicle body, an axle or support, a pair of independent yokes or frames mounted for independent rocking movement at opposite sides of the vehicle upon the axle or support in conformity to the road-bed, wheels supported at opposite parts of each of said yokes or frames, and a spring connection between each of the yokes or frames and the vehicle body.

15. Running gear for trackless power driven vehicles, comprising, in combination, a vehicle body, an axle or support, a pair of independent yokes or frames mounted for independent rocking movement at opposite sides of the vehicle upon the axle or support, in conformity to the road bed, and means to deflect the said wheels of each yoke or frame in opposite directions simultaneously.

In testimony whereof, I have signed my name to this specification, in the presence of two subscribing witnesses.

ISAAC E. PALMER.

Witnesses:
FRED. E. FOWLER,
REUBEN MYRON BURR.